United States Patent
Kawamura et al.

(10) Patent No.: US 6,566,432 B2
(45) Date of Patent: May 20, 2003

(54) COLORING RESIN COMPOSITION AND MOLDED ARTICLES

(75) Inventors: Masayasu Kawamura, Chuo-ku (JP); Masashi Koide, Chuo-ku (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/880,936

(22) Filed: Jun. 15, 2001

(65) Prior Publication Data

US 2002/0013397 A1 Jan. 31, 2002

(30) Foreign Application Priority Data

Jun. 21, 2000 (JP) ........................................ 2000-186413

(51) Int. Cl.⁷ ................................................ C08L 5/06
(52) U.S. Cl. ........................ 524/376; 524/378; 524/366; 524/385; 524/391; 524/570; 524/585; 523/333; 523/334; 523/339
(58) Field of Search ........................... 524/366; 523/333, 523/334, 339

(56) References Cited

U.S. PATENT DOCUMENTS 5,455,214 A * 10/1995 Furtek et al. ................ 502/109
5,872,164 A * 2/1999 Koike et al. ................. 523/339
6,335,410 B1 * 1/2002 Finlayson et al. ........... 526/348

FOREIGN PATENT DOCUMENTS

| JP | 61-126139 |   | 6/1986 |           |
|----|-----------|---|--------|-----------|
| JP | 7-53772 A | * | 2/1995 |           |
| JP | 7-53772   | * | 2/1995 | ............ C08L/5/05 |

OTHER PUBLICATIONS

JP 7–53772 A Abstract in English.*
Aldrich Catalogue (2000–2001) p. 1364 and p. 1645.*

* cited by examiner

*Primary Examiner*—David W. Wu
*Assistant Examiner*—Rip A. Lee
(74) *Attorney, Agent, or Firm*—Oblon, Spivak, McClelland, Maier & Neustadt, P.C.

(57) ABSTRACT

Disclosed is a coloring resin composition comprising a dispersing agent, a pigment and a thermoplastic resin, in which the dispersing agent is expressed by the following Formula 1 and the thermoplastic resin is metallocene polyolefin:

$$C_nH_{2n+1}(OCH_2CH_2)_mOH \qquad \text{Formula 1}$$

wherein n is an integer of 26 to 50, and m is an integer of 4 to 100. The composition is useful in coloring molded articles of thermoplastic resin. Colored resin molded articles using the composition are also disclosed.

10 Claims, No Drawings

COLORING RESIN COMPOSITION AND MOLDED ARTICLES

BACKGROUND OF THE INVENTION

1. Field of the Invention

The present invention relates to a coloring resin composition. More specifically, the present invention relates to a coloring resin composition for use in coloring molded articles of thermoplastic resin, and a colored resin molded article obtained by using the coloring resin composition.

2. Description of the Related Art

Conventional coloring resin compositions for use in coloring molded articles of thermoplastic resin or manufacturing colored resin molded articles, include powdered dry color in which pigment and a dispersing agent are mixed; liquid color or paste color in which pigment is dispersed in a dispersing agent that is in liquid state at room temperature; and pellet-, flake- or bead-shape coloring pellets (also termed coloring compound) or master batches in which pigment is dispersed in resin that is in solid state at room temperature. The master batches are the same as the coloring pellets in that pigment is dispersed in resin that is solid at room temperature. However, the coloring pellets are different from the master batch in that the coloring pellets are molded as they are while the master batches are diluted first with appropriate thermoplastic resin (resin for dilution or resin to be colored) before being molded, since the pigment concentration is high.

The coloring resin compositions are selected for application on the basis of their characteristics. Among them, master batches are preferably used due to ease of handling and in consideration of the working environment during the application. Master batches are high in pigment concentration and have little effect on various properties such as heat resistance and strength of thermoplastic resin to be colored. Additionally, pigment dispersibility is required to be higher than previously, as polyolefin resin has been molded with improved precision and accelerated speed.

Generally, the following dispersing agents are used in order to add pigment dispersibility in a master batch. The agents include stearic acid; metallic soap such as zinc stearate, magnesium stearate, aluminum stearate and calcium stearate; ethylene bisamide; hydrocarbon wax such as polyethylene wax and polypropylene wax; and derivatives thereof such as wax consisting of an acid modified product or a hydroxyl group modified product.

However, when high pigment dispersibility is required in order to mold articles by high-speed spinning at a diameter of 10 and several microns, or by forming into films, the above-noted dispersing agents have not provided sufficient dispersibility.

In Japanese Unexamined Patent Application Publication No. 7-53772, a compound expressed by the following chemical formula is used as a dispersing agent of a coloring resin composition:

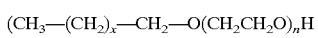

wherein x is 28 to 48 on average, and n is 1 to 16.

This dispersing agent provides more preferable results than does a conventional agent. However, such problems due to lack of pigment dispersion are still found as thread breakage during spinning, clogging filters of melt spinning apparatus, and the development of lumps on a film surface. Moreover, although the composition may be spun at high speed or formed into a film, a molded article thereof is not often practically strong enough when higher mechanical physical strength is required for the molded article.

In order to solve the above-noted problems and enhance pigment dispersibility, attempts to improve the processing methods of master batches, to use a high-powered kneading machine, and so forth have been made. However, sufficient pigment dispersibility has not yet been achieved therefrom.

SUMMARY OF THE INVENTION

Accordingly, it is an object of the present invention to provide a coloring resin composition having excellent pigment dispersibility and high coloring properties. The coloring resin composition can be used as a master batch without giving physical inhibitions of 5% or higher to each mechanical strength of resin to be colored, such as tensile strength, flexural modulus and impact strength. It is another object of the present invention to provide a colored resin molded article by using the coloring resin composition.

In order to achieve the above-noted objects, a coloring resin composition according to a first aspect of the invention includes a dispersing agent, a pigment and a thermoplastic resin. The following Formula 1 expresses the dispersing agent, and the thermoplastic resin is a metallocene polyolefin:

$$C_nH_{2n+1}(OCH_2CH_2)_mOH \qquad \text{Formula 1}$$

wherein n is an integer of 1 to 100, and m is an integer of 1 to 100.

A coloring resin composition according to a second aspect of the invention is provided by removing water from a mixture of a dispersing agent expressed by the same Formula 1 as above, a pigment, water and a metallocene polyolefin.

Subsequently, the coloring resin composition of the present invention is used to provide a colored resin molded article according to the present invention. The coloring resin composition of the present invention has excellent pigment dispersibility and good coloring properties, so that colored resin molded products having excellent mechanical strength and high coloring properties can be manufactured therefrom.

The coloring resin composition according to the present invention can be used as a master batch or coloring pellets not only for colored resin molded articles but also for others such as ink, coating paint and adhesive.

DESCRIPTION OF THE PREFERRED EMBODIMENT

The embodiments of the present invention will be explained in detail below.

The metallocene polyolefin is a general term of polyolefin in which metallocene is used as a catalyst for polymerization. This polymer is a high molecular weight polymer having higher monodispersibility and a narrower molecular weight distribution (for instance, Mw/Mn<2 in case of metallocene polyethylene) than a polymer in which conventional Ziegler catalyst, Ziegler-Natta catalyst or the like is used. The polymer obtained thereby has low crystallinity and is nearly amorphous. The density and melting point thereof are significantly lower than those of general polyolefin consisting of the same monomer that is polymerized by a non-metallocene catalyst.

Such polymer and the dispersing agent of the above-noted Formula 1 are used for the coloring resin composition, so that a large amount of pigment can be dispersed quite evenly.

Accordingly, the composition can provide molded articles having excellent mechanical strength without such problems as breakage of films due to lack of pigment dispersibility, and is also suitable for spinning and forming into films. Moreover, since pigment dispersibility is preferable, the coloring resin composition also has excellent coloring properties.

According to the knowledge of the present inventors, the water with which the pigment particles are wetted evaporates during a melting and kneading process when a mixture of a dispersing agent, pigment and resin contains water, and the surface of the pigment particles which are refined by shearing during kneading is coated with molten thermoplastic resin, thus preventing the re-agglomeration of pigment particles and providing a resin composition having excellent pigment dispersibility. The present inventors also found that the dispersibility of pigment improves by carrying out the flushing of pigment from the aqueous phase to a resin phase slowly at the temperatures near the boiling point of water. The use of metallocene polyolefin having a lower melting point than general polyolefin has also the advantage of carrying out such flushing easily and effectively.

The dispersing agent used in the coloring resin composition of the present invention containing a dispersing agent, a pigment and a thermoplastic resin is expressed in the following Formula 1:

   Formula 1 wherein n is an integer of 1 to 100, and m is an integer of 1 to 100.

When n exceeds 100 in the formula above, pigment dispersibility may decline. At the same time, the melting point of the dispersing agent rises, so that processability may deteriorate when resin to be colored has a low melting point. Moreover, when m exceeds 100, the dispersing agent may start decomposing and foaming due to heat during the processing of the coloring resin composition. It is preferable that n ranges from 26 to 50 and m ranges from 4 to 100. Furthermore, it is preferable to use a dispersing agent having a melting point of 60° C. to 120° C. in consideration of the flushing temperature mentioned above. This is because pigment may not be well dispersed when a dispersing agent is not melted at the flushing temperature. Moreover, the melting point of a dispersing agent is preferably 60° C. or higher in consideration of smooth material transportation during extrusion processing. It is also preferable that the melting point is 120° C. or lower in consideration of quick dispersibility into resin to be colored. The melting point in the present invention is the peak temperature of a melting point measured under a nitrogen gas stream and the temperature increase rate of 10° C./minute by a differential scanning calorimeter.

A base thermoplastic resin includes metallocene polyolefin that is polymerized by the catalyst of a metallocene compound. Metallocene polyolefins are highly compatible with other resins (polyolefins). Specifically, a master batch of general polyethylene is not compatible with, for instance, polypropylene (resin to be colored), while metallocene polyethylene is compatible with polypropylene. Thus, the coloring resin composition of the present invention is generally and widely applicable as a master batch. Additionally, molded articles having excellent mechanical properties can be provided by evenly mixing the composition with resin to be colored. The reason for high compatibility is thought to be that metallocene polyolefins have low crystallinity and only a few crystals are formed evenly and finely, so that the crystal growth of resin to be colored is not prevented. Additionally, this polymer contains many tie molecules, and has the advantage of providing molded articles having excellent mechanical strength (impact strength, tensile strength and so forth).

The metallocene compound is a general term of compounds in which ligands including at least the one having a cyclopentadienyl skeleton coordinate to a tetravalent transition metal such as titanium, zirconium, nickel palladium, hafnium, niobium and platinum.

Examples of the ligands having a cyclopentadienyl skeleton include cyclopentadienyl group; alkyl-substituted cyclopentadienyl groups such as methylcyclopentadienyl group, ethylcyclopentadienyl group, n- or i-propylcyclopentadienyl group, n-, i-, sec-, or tert-butylcyclopentadienyl group, hexylcyclopentadienyl group and octylcyclopentadienyl group; alkyl disubstituted cyclopentadienyl groups such as dimethylcyclopentadienyl group, methylethylcyclopentadienyl group, methylpropylcyclopentadienyl group, methylbutylcyclopentadienyl group, methylhexylcyclopentadienyl group, ethylbutylcyclopentadienyl group and ethylhexylcyclopentadienyl group; alkyl polysubstituted cyclopentadienyl groups such as trimethylcyclopentadienyl group, tetramethylcyclopentadienyl group, and pentamethylcyclopentadienyl group; cycloalkyl substituted cyclopentadienyl groups such as methylcyclohexylcyclopentadienyl group; indenyl group; 4, 5, 6, 7-tetrahydroindenyl group; fluorenyl group; and so forth.

Examples of ligands, besides the ones having a cyclopentadienyl skeleton, include monovalent anion ligands such as base and bromine; bivalent anion chelate ligands; hydrocarbon groups; alkoxides; amides; arylamides; aryloxides; phosphide; arylphosphide; silyl groups; substituted silyl groups; and so forth. Examples of the hydrocarbon groups include the ones having about 1 to 12 carbon atoms. For example, the hydrocarbon groups include alkyl groups such as methyl group, ethyl group, propyl group, butyl group, isobutyl group, amyl group, isoamyl group, hexyl group, heptyl group, octyl group, nonyl group, decyl group, cetyl group, and 2-ethylhexyl group; cycloalkyl groups such as cyclohexyl group and cyclopentyl group; aryl groups such as phenyl group and tolyl group; aralkyl groups such as benzyl group and neophyl group; nonylphenyl group; and so forth.

Specifically, examples of the metallocene compounds in which ligands including the one having a cyclopentadienyl skeleton form coordinate bonds, include cyclopentadienyltitanium tris(dimethylamide); methylcyclopentadienyltitanium tris(dimethylamide); bis(cyclopentadienyl)titanium dichloride; dimethylsilyltetramethylcyclopentadienyl-tert-butylamidozirconium dichloride; dimethylsilyltetramethylcyclopentadienyl-p-n-butylphenylamido zirconium dichloride; methylphenylsilyltetramethylcyclopentadienyl-tert-butylamidohafnium dichloride; dimethylsilyltetramethylcyclopentadienyl-tert-butylamidohafnium dichloride; indenyltitanium tris(dimethylamide); indenyltitanium tris(diethylamide); indenyltitanium bis(di-n-butylamide); indenyltitanium bis(di-n-propylamide); and so forth.

Such metallocene compounds can be used as a catalyst system to which methylaluminoxan, boron compounds, or the like is added as cocatalyst. In this case, it is preferable that the cocatalyst 1 to one million molar times the metallocene compound is added thereto.

Examples of polyolefins include polyethylene, polypropylene, copolymer (random or block copolymer) of ethylene and propylene, and copolymer of ethylene or propylene and α-olefins (excluding ethylene or propylene) and so forth. Or low grade polymers by the thermal decomposition of the polyolefins mentioned above may be applicable. They can be used singly or in combinations.

Examples of the α-olefins include 1-butene, 1-pentene, 1-hexene, 1-heptene, 1-octene, 4-methyl-1-pentene, 1-decene, 1-dodecene, 1-tetradecene, 1-hexadecene, 1-octadecene, and the like. As the α-olefin that is copolymerized with ethylene, it is preferable to use 1-butene, 1-hexene and 1-octene. As the a-olefin that is copolymerized with propylene, it is preferable to use 1-butene and 1-hexene.

Preferably, use can be made of metallocene polyethylene because of its low melting point and low density.

The melting point of polymer ranges preferably from 40° C. to 120° C., more preferably from 50° C. to 100° C. Particularly, when the melting point of polymer is 100° C. or lower, the processing temperature can be set at around 90° C., thus maximizing flushing efficiency, which is preferable. When the melting point is too low, the polymer may become sticky at room temperature, resulting in poor operation. Additionally, the drying step of the coloring resin composition may become troublesome. The density of the polymer is preferably 0.19 g/cm$^3$ or smaller in consideration of the relationship with the melting point mentioned above, more preferably 0.87 g/cm$^3$ or greater in consideration of handling, and further preferably 0.875 to 0.905 g/cm$^3$.

In a preferable embodiment, a polymer with the melt flow rate (MFR) of 0.1 to 400, and more preferably 5 to 250 can be chosen. When MFR is smaller than 0.1, the compatibility of the polymer with resin to be colored may decline, causing unevenness of color on molded articles and providing negative effects on various properties. On the other hand, when MFR is beyond 400, it may become difficult to manufacture the coloring resin composition and various properties such as the strength of molded articles may deteriorate. Here, the MFR is measured according to JIS K7210.

The pigment may be at least one type selected from conventional organic pigments and inorganic pigments which have been conventionally used for coloring printing inks, paints or thermoplastic resins, and there is no particular limitation.

Examples of the organic pigments include azo pigments such as azo lake, Hansas, benzimidazolones, diarylides, pyrazolones, yellows and reds; polycyclic pigments such as phthalocyamines, quinacridones, perylenes, perinones, dioxazines, anthraquinones and isoindolins; and Aniline Black. Examples of the inorganic pigments include inorganic pigments such as titanium oxide, titanium yellow, iron oxide, ultramarine blue, cobalt blue, chromic oxide green, Lead Yellow, cadmium yellow and cadmium red; and carbon black pigments. They can be used singly or in combination.

These pigments may be in any form of a dry powder, wet cake containing water before submitted to a drying process, or a mixture thereof.

The coloring resin composition according to the present invention contains at least dispersing agent, pigment and metallocene polyolefin mentioned above. The composition can be used as a master batch that contains pigment at high concentration and is diluted with resin to be colored during a molding process. Or the composition can be used as coloring pellets that have relatively low pigment concentration and are molded as they are without being diluted with resin to be colored. Mixing ratios of each component in the composition are not particularly limited, and may be appropriately selected in accordance with its uses, applications and so forth.

For instance, when the coloring resin composition is used as coloring pellets, it is preferable that the pigment is contained at 0.01 wt. % or more in consideration of tinting strength, the hue and so forth. Moreover, in consideration of the appearance of molded articles (for example, no lumps due to pigment coagglomeration), the content thereof is preferably 40 wt. % or less. When the coloring resin composition is used as a master batch, the pigment is preferably contained at 0.01 wt. % or more in order to economically provide the targeting hue and tinting strength, and in consideration of pigment dispersibility and so forth the content thereof is preferably 90 wt. % or less, and more preferably 20 to 80 wt. %.

A dispersing agent and thermoplastic resin are preferably mixed at the ratio of 0.01 to 30 wt. % and 10 to 99.9 wt. %, respectively.

The coloring resin composition may also contain various additives such as wax, antioxidant, ultraviolet light absorber and a surface active agent within a range that does not inhibit the effects of the present invention, if necessary.

Subsequently, a coloring resin composition according to another present invention is provided by removing water from the mixture of the dispersing agent, pigment, water and metallocene polyolefin described above. The same characteristics as those of the composition mentioned above are omitted herein, and other characteristics are explained below.

The water may be tap water, distilled water, ion-exchanged water, hard water, soft water or the like, and is used with no particular limitation. However, it is preferable that the water contains no components (coarse particles, dissolved matters, ions, and so forth) that may limit uses or applications of the coloring resin composition.

It is preferable that the mixture containing the dispersing agent, pigment, water and metallocene polyolefin is prepared by adding pigment to the aqueous solution of a dispersing agent or the aqueous dispersion of a dispersing agent so as to provide further preferable pigment dispersion. Pigment dispersibility improves by using the aqueous medium of a dispersing agent instead of directly mixing the dispersing agent. The aqueous medium here refers to the mixture of a dispersing agent and water, the aqueous solution of a dispersing agent when the dispersing agent is soluble in water or the aqueous dispersion of a dispersing agent when the dispersing agent is not soluble in water, or the combination thereof. Accordingly, the mixture becomes suitable for spinning, film forming, and so forth that require high dispersibility of pigment. Moreover, the mechanical properties of molded articles become further preferable. In this case, it is preferable that the mixture contains 1 to 30 weight parts of the aqueous medium of a dispersing agent, 0.01 to 90 weight parts of pigment, and 1 to 90 weight parts of thermoplastic resin.

The concentration of a dispersing agent relative to water (or concentration of a dispersing agent in an aqueous medium) is preferably 1 wt. % or more in order to efficiently provide pigment dispersibility and 80 wt. % or less in consideration of handling and practicality. The concentration of 5 to 50 wt. % is particularly preferable. When powdered dry pigment is used, the concentration of water is preferably 5 wt. % or more in order to fully provide the effects of adding water and preferably 200 wt. % or less in consideration of efficiency during dehydration step.

The mixing order of each component of the mixture is not particularly limited. In case of adding pigment and metallocene polyolefin to the aqueous solution of a dispersing agent or the aqueous dispersion of a dispersing agent, pigment and resin may be added at the same time, or pigment may be added first, followed by mixing the mixture obtained thereby and resin.

A general kneading machine or extruder may be used to manufacture the coloring resin composition. The design and operating conditions of each machine are not particularly limited.

In a preferable embodiment the composition can be manufactured as follows; the aqueous dispersion of a dispersing agent, pigment and metallocene polyolefin are mixed by a Henschel mixer or the like, and is then heated and mixed by a flusher, kneader, extruder, roll mill, ball mill, steel mill, sand mill, Attoritor, high-speed mixer, homomixer or the like; subsequently, the remaining water is removed and the mixture is pushed out under normal pressure or reduced pressure, thus manufacturing the coloring resin composition. Herein, the heating and mixing should be performed at the temperatures in which thermoplastic resin and a dispersing agent become melted. In order to further improve pigment dispersibility, the heating and mixing are preferably performed at the temperatures around the boiling point of water. In other words, processing temperature (not the setting temperature but actual heating temperature) ranges preferably from about 90° C. to about 130° C. Moreover, in order to efficiently dehydrate, it is preferable that a vacuum pump is connected to an extruder so as to heat, decompress and dehydrate the mixture, as required.

A colored resin molded article according to the present invention is molded from the coloring resin composition of the present invention by an optional method. The molding method is preferably extrusion molding or injection molding. The resin to be colored that is mixed with a master batch during molding is preferably the one that is compatible with thermoplastic resin used for the coloring resin composition, and may be optionally chosen. Preferable examples thereof include polyolefin resins. In order to improve physical properties, the coloring resin composition of the present invention may be mixed with resin to be colored containing a reinforcing agent such as an inorganic filler and glass fiber.

When the coloring resin composition of the present invention is extrusion-molded into particularly thin articles such as films, the films with superb pigment dispersibility and excellent surface conditions, with no cords or the like, can be efficiently provided. Moreover, when the coloring resin composition of the present invention is injection-molded, molded articles with no unevenness of color and flow marks can be provided.

EXAMPLES

The present invention will be explained in further detail by referring to examples. However, the present invention is not limited to the examples as long as the examples do not deviate from the technical idea of the present invention. Hereinafter, "weight parts" and "wt. %" are merely described as "parts" and "%", respectively.

1. Manufacturing Master Batches or Coloring Pellets

Example 1

A Henschel mixer was used to stir and mix 16 parts of aqueous dispersion containing a dispersing agent expressed by the Formula 1 (melting point: 105° C.; n=30; m=10) % at 25%, 46 parts of metallocene polyethylene resin manufactured by Nihon Polychem Corp. (melting point: 58° C.; MFR: 50; density: 0.880 g/cm$^3$), and 50 parts of copper phthalocyanine blue "Lionol Blue FG7330" manufactured by Toyo Ink Manufacturing Co., Ltd. The mixture was heated, melted and kneaded by an extruder having a screw diameter of 30 mm and a setting temperature of 90° C., and was pelletized while water was removed by a vacuum pump. A master batch was smoothly provided without the breakage of strands and pulsating flow.

Example 2

The same aqueous dispersion containing the dispersing agent, pigment and resin as in Example 1 were used. A master batch was smoothly provided as in Example 1, except that the aqueous dispersion of the dispersing agent and the pigment were first stirred and mixed and the resin was added thereafter.

Example 3

A Henschel mixer was used to stir and mix 4 parts of the same dispersing agent (not aqueous dispersion), 46 parts of the same thermoplastic resin and 50 parts of the same pigment as in Example 1. The mixture was melted, kneaded and pelletized by an extruder having a screw diameter of 30 mm and a setting temperature of 90° C. A master batch was smoothly provided without the breakage of strands and pulsating flow.

Comparative Example 1

A master batch was provided as in Example 3, except that 4 parts of polyethylene wax "San Wax 131P" manufactured by Sanyo Chemical Industries, Ltd. were used as a dispersing agent.

Comparative Example 2

A master batch was provided as in Example 3, except that 4 parts of magnesium stearate "NP 1500" manufactured by Tannan Kagaku Kogyo Co., Ltd. were used as a dispersing agent.

Comparative Example 3

A master batch was provided as in Example 3 by using 50 parts of the same thermoplastic resin and 50 parts of the same pigment as in Example 1 without using the dispersing agent.

Comparative Example 4

A master batch was provided as in Example 1 by using 12 parts of water, and 50 parts of the same thermoplastic resin and 50 parts of the same pigment as in Example 1 without using the dispersing agent.

Comparative Example 5

A master batch was provided as in Example 1, except that 16 parts of aqueous dispersion containing polyoxyethyleneglycolether phosphate "Phosphanol GB520" manufactured by Toho Chemical Industry Co., Ltd. at 25% as a dispersing agent were used.

Comparative Example 6

A master batch was provided as in Example 1, except that 16 parts of aqueous dispersion containing perfluoroalkyl phosphate "Surflon S-112" manufactured by Asahi Glass Co., Ltd. at 25% as a dispersing agent were used.

Examples 4 to 12

Master batches were provided as in Example 1, except that the pigment and thermoplastic resin were replaced with the following pigment and resin.

Example 4

Titanium oxide "Tipaque CR-60" manufactured by Ishihara Sangyo Kaisha, Ltd.: 70 parts; the same metallocene polyethylene resin as in Example 1: 26 parts

Example 5

Carbon black "950B" manufactured by Mitsubishi Chemical Corp: 70 parts; the same metallocene polyethylene resin as in Example 1: 26 parts

Example 6

Quinacridone red "Fastgene Super Magenta RE03" manufactured by Dainippon Ink & Chemicals, Inc.: 50 parts; the same metallocene polyethylene resin as in Example 1: 46 parts

Example 7

Isoindolinone Yellow "Irgazin Yellow 3RLT-N" manufactured by Ciba Specialty Chemicals Corporation: 50 parts; the same metallocene polyethylene resin as in Example 1: 46 parts

Example 8

Copper phthalocyanine green "Lionol Green POG-T" manufactured by Toyo Ink Manufacturing Co., Ltd.: 50 parts; the same metallocene polyethylene resin as in Example 1: 46 parts

Example 9

Titanium yellow "Fellow 42-145A" manufactured by Nippon Fellow K. K.: 70 parts; the same metallocene polyethylene resin as in Example 1: 26 parts

Example 10

Ultramarine blue "Ultramarine Blue #2000" manufactured by Dai Ichi Kasei K. K.: 70 parts; the same metallocene polyethylene resin as in Example 1: 26 parts

Example 11

Yellow iron oxide "Bayferrox #3950" manufactured by Bayer AG: 70 parts; the same metallocene polyethylene resin as in Example 1: 26 parts

Example 12

Red iron oxide "Toda Color 120ED" manufactured by Toda Kogyo Corp.: 70 parts; the same metallocene polyethylene resin as in Example 1: 26 parts

Comparative Examples 7 to 15

Master batches were provided as in Example 1 by using 12 parts of water and the pigments and thermoplastic resins used in Examples 4 to 12 respectively, without using the dispersing agent. In each comparative example, the resin was added by 4 more parts than in the corresponding example (mixing amount of pigment is the same as in the corresponding example).

Example 13

A master batch was provided as in Example 1, except that 16 parts of aqueous dispersion containing the dispersing agent (melting point: 106° C.; n=30; m=94) expressed by the formula 1 at 25% were used.

Example 14

A master batch was provided as in Example 1, except that 16 parts of aqueous dispersion containing the dispersing agent (melting point: 115° C.; n=50; m=8) expressed by the formula 1 at 25% were used.

Example 15

A master batch was provided as in Example 1, except that 46 parts of metallocene polyethylene resin manufactured by Nihon Polychem Corp. (melting point: 90° C.; MFR: 16.5; density: 0.898 g/cm$^3$) as thermoplastic resin were used. The temperature of an extruder was set at 100° C.

Comparative Example 16

A master batch was provided as in Example 15, except that 4 parts of polypropylene wax "Viscol 660P" manufactured by Sanyo Chemical Industries, Ltd. as a dispersing agent were used.

Comparative Example 17

A master batch was provided as in Example 15, except that 16 parts of aqueous dispersion containing the polyoxyethyleneglycolether phosphate used in Comparative Example 5 at 25% were used. Strand foaming and pulsating flow were found.

Comparative Example 18

A master batch was provided as in Example 15, except that 16 parts of aqueous dispersion containing the perfluoroalkyl phosphate used in Comparative Example 6 at 25% were used. Strand foaming and pulsating flow were found.

Example 16

Coloring pellets were smoothly provided without the breakage of strands and pulsating flow by using 2 parts of aqueous dispersion containing the same dispersing agent as in Example 1 at 25%, and 98 parts of the same thermoplastic resin and 1.5 parts of the same pigment as in Example 1 for pelletizing as in Example 1.

Comparative Example 19

Coloring pellets were smoothly provided without the breakage of strands and pulsating flow by using 100 parts of the same thermoplastic resin and 1.5 parts of the same pigment as in Example 16 without using the dispersing agent for pelletizing as in Example 16.

Comparative Example 20

A master batch was provided as in Example 1, except that 46 parts of polyethylene resin "Hizex 2100J" manufactured by Mitsui Chemicals Inc. (melting point: 127° C.; MFR: 6; density: 0.956 g/cm$^3$) as thermoplastic resin were used. The temperature of an extruder was set at 150° C.

Comparative Example 21

A master batch was provided as in Example 1, except that 46 parts of polypropylene resin "Grand Polypro F327BV" manufactured by Grand Polymer Co., Ltd. (melting point: 130° C.; MFR: 7) as thermoplastic resin were used. The temperature of an extruder was set at 180° C.

2. Evaluation of Master Batches and Coloring Pellets

The master batches and coloring pellets of the above-noted examples and comparative examples were evaluated, and the results thereof are shown in Tables 1 and 2. Evaluation methods and standards are shown below.
[Productivity Evaluation]
(1) Productivity Evaluation of Master Batches/Coloring pellets 3: Smooth production with no breakage of strands and pulsating flow 2: Production with some pulsating flow but no strand breakage 1: Difficulty in production with the breakage of strands and pulsating flow

[Evaluation of Film Articles]

The master batches and polypropylene "F327BV" manufactured by Grand Polymer Co., Ltd. as resin to be colored were mixed at the pigment concentration of 1.5%. The mixture was melted and extruded by a T die film molding machine manufactured by Toyo Seiki Seisakusho K. K. at the molding temperature of 250° C. and the screw rotational frequency of 50 rmp, thus providing films of 30 µm in film thickness. The coloring pellets were similarly formed into films with the same composition.

The films were evaluated as described below.
(2) Observation of Film Voids and Strength Evaluation Film cross sections were observed by an electron microscope (×3000). The number of observed voids was presented as the average of five visual fields. The tensile strength of the films was measured according to JIS K7113, and the retention ratio thereof was obtained. It is considered good if the number of voids is 7 or less and the retention ratio of strength is 96% or more.

(3) Evaluation of Film Surface Condition (Visual Evaluation of Cracking, Lumps and Smoothness)

4: Extremely good

3: Practically no problems

2: Problems with cracking, lumps or smoothness

1: Poor

-: No evaluation

[Evaluation of Pigment Dispersibility]

The pigment dispersibility of the master batches and coloring pellets were evaluated as described below.
(4) Pressure Rise at the Fore Ends of Extruder When much pigment that is not dispersed in the master batches and coloring pellets exists, a mesh is clogged during an extrusion process. Thus, the master batches and coloring pellets were extruded at 300 g as a pigment component by using a single screw extruder that is mounted with a 10 micron cut wire mesh at the fore ends thereof, and that has the screw diameter of 20 mm. A difference (kg/cm$^2$) was found between the pressure on the mesh at the initial stage of extrusion and the pressure on the mesh after the composition was extruded by 300 g. It is considered good if the pressure rise is 30 kg/cm$^2$ or less.

(5) Number of Coarse Particles

An image processor "Luzex 450" manufactured by Toyo Ink Manufacturing Co., Ltd. was used to evaluate the T die films which were evaluated in (2) and (3) above, by observing the number of pigment particles of 1 µm to 50 µm in each film. The following score was given. It is considered good if the score is 4 or higher.

5: less than $1.0 \times 10^3$/cm$^2$

4: $1.0 \times 10^3$ to less than $7.0 \times 10^3$/cm$^2$

3: $7.0 \times 10^3$ to less than $2.7 \times 10^4$/cm$^2$

2: $2.7 \times 10^4$ to less than $7.0 \times 10^4$/cm$^2$

1: $7.0 \times 10^4$/cm$^2$ or more (6) Relative Coloring Intensity of Heat-Press Sheet The mixtures were prepared by mixing 100 parts of polypropylene "J106" manufactured by Grand Polymer Co., Ltd., 1 part of each master batch provided in Examples 1 to 3 and 5 to 15 and Comparative Examples 1 to 6, 8 to 18, 20 and 21, and 5 parts of titanium oxide "Tipaque CR-60" manufactured by Ishihara Sangyo Kaisha, Ltd. After each mixture was kneaded by a two roll mill, heat-pressing was performed to provide a 2 mm thick plate.

For the master batches of Example 4 and Comparative Example 7, 10 parts of the above-noted resin, 1 part of each master batch and 0.01 part of carbon "Mitsubishi Carbon #44" manufactured by Mitsubishi Chemical Corp. were mixed, and 2 mm thick plates were similarly provided therefrom.

Moreover, 100 parts of the coloring pellets obtained in Example 16 and Comparative Example 19 and 5 parts of the titanium oxide mentioned above were mixed, and 2 mm thick plates were similarly provided therefrom.

A calorimeter "KURABO COLOR-7E" manufactured by Kurabo Industries Ltd. was used to measure reflection intensity of each plate at wavelengths of 430 nm, 540 nm, 620 nm and 640 nm. The Kubelka-Munk scattering coefficients k/s (coloring intensity) of each plate were obtained from the reflection intensity. The lightness (ΔL) of the plates was observed for the titanium oxide master batches of Example 4 and Comparative Example 7, and the carbon master batches of Example 5 and Comparative Example 8.

Relative coloring intensity was given on the basis of the following coloring intensities. In Examples 1 to 3, 13, 14 and Comparative Examples 1 to 6, 20, 21, the coloring intensity of the plate of Example 1 is 100%, In Example 6 and Comparative Example 9, the coloring intensity of the plate of Example 6 is 100%. In Example 7 and Comparative Example 10, the coloring intensity of the plate of Example 7 is 100%. In Example 8 and Comparative Example 11, the coloring intensity of the plate of Example 8 is 100%. In Example 9 and Comparative Example 12, the coloring intensity of the plate of Example 9 is 100%. In Example 10 and Comparative Example 13, the coloring intensity of the plate of Example 10 is 100%. In Example 11 and Comparative Example 14, the coloring intensity of the plate of Example 11 is 100%. In Example 12 and Comparative Example 15, the coloring intensity of the plate of Example 12 is 100%. In Example 15 and Comparative Examples 16 to 18, the coloring intensity of the plate of Example 15 is 100%. In Example 16 and Comparative Example 19, the coloring intensity of the plate of Example 16 is 100%. Moreover, each ΔL was given on the basis of the lightness of the plate of Example 4 for Example 4 and Comparative Example 7 and on the basis of the lightness of the plate of Example 5 for Example 5 and Comparative Example 8.

(7) Evaluation of Spinnability

The mixture was prepared by mixing each master batch in an amount of 1.5 parts as a pigment component and 100 parts of polypropylene resin "S106L" manufactured by Grand Polymer Co., Ltd. The mixture was spun by a vertical spinning machine "Spinning Tester" manufactured by Fuji Filter Co. at 180° C. under a hopper and 230° C. at a kneading section and a dice section, and was subsequently stretched three times, thus providing polypropylene fibers. The coloring pellets were similarly spun as they were with the same composition, and were then stretched three times, thus providing polyethylene fibers. The spinnability of each fiber was evaluated as follows:

3: No practical problems in spinnability and stretchability

2: Problems in either spinnability or stretchability

1: Breakage of fiber
-: No evaluation

[Evaluation of Injection Molded Articles]

The injection moldability of the master batches and coloring pellets were evaluated as follows.

(8) Retention of Mechanical Properties

The mixture was prepared by mixing each master batch in an amount of 1.5 parts as a pigment component and 100 parts of polypropylene "J106" manufactured by Grand Polymer Co., Ltd. The mixture was injection molded by an injection molding machine at 10 kg/cm² of back pressure, thus providing a plate. The coloring pellets were similarly injection molded as they were with the same composition, thereby providing a plate. Additionally, a plate was similarly injection molded solely from the polypropylene as resin to be colored.

For each plate, tensile strength, flexural modulus and Izod impact strength tests were carried out. The retention ratio of mechanical properties of each plate was provided on the basis of the retention ratio of the plate, which consists solely of the resin to be colored, assumed to be 100%. Evaluation was given as follows in accordance with the retention ratio of mechanical properties based on the three tests.

3: 96% or higher in all tests
2: 90% to below 96% in one or more tests
1: below 90% in one or more tests (9) Dispersibility The unevenness of color was visually evaluated for the plates obtained in (8).

3: No unevenness of color
2: Some unevenness of color
1: Clear unevenness of color
-: No evaluation

TABLE 1

Evaluation of Examples

| Examples | (1) Productivity | (2) Number of voids (average) | (2) Retention ratio of strength (%) | (3) Surface condition | (4) Pressure rise (kg/cm²) | (5) Number of coarse particles | (6) Coloring intensity (%) | (6) Lightness (ΔL) | (7) Spinnability | (8) Retention of mechanical properties | (9) Unevenness of color |
|---|---|---|---|---|---|---|---|---|---|---|---|
| 1 | 3 | 0 | 100 | 4 | 5 | 5 | 100 | | 3 | 3 | 3 |
| 2 | 3 | 0 | 100 | 4 | 3 | 5 | 100 | | 3 | 3 | 3 |
| 3 | 3 | 5.2 | 96 | 3 | 19 | 4 | 98 | | 3 | 3 | 3 |
| 4 | 3 | 0.8 | 100 | 4 | 20 | 4 | | 0 | 3 | 3 | 3 |
| 5 | 3 | 1.2 | 99 | 4 | 12 | 5 | | 0 | 3 | 3 | 3 |
| 6 | 3 | 0.4 | 100 | 4 | 11 | 5 | 100 | | 3 | 3 | 3 |
| 7 | 3 | 0.2 | 100 | 4 | 7 | 5 | 100 | | 3 | 3 | 3 |
| 8 | 3 | 1.4 | 98 | 4 | 13 | 5 | 100 | | 3 | 3 | 3 |
| 9 | 3 | 0.2 | 100 | 4 | 10 | 5 | 100 | | 3 | 3 | 3 |
| 10 | 3 | 1.0 | 100 | 4 | 15 | 5 | 100 | | 3 | 3 | 3 |
| 11 | 3 | 0.4 | 100 | 4 | 9 | 5 | 100 | | 3 | 3 | 3 |
| 12 | 3 | 0.6 | 100 | 4 | 6 | 5 | 100 | | 3 | 3 | 3 |
| 13 | 3 | 0 | 100 | 4 | 7 | 5 | 108 | | 3 | 3 | 3 |
| 14 | 3 | 0 | 100 | 4 | 9 | 5 | 109 | | 3 | 3 | 3 |
| 15 | 3 | 1.4 | 99 | 4 | 4 | 5 | 100 | | 3 | 3 | 3 |
| 16 | 3 | 0.2 | 100 | 4 | 6 | 5 | 100 | | 3 | 3 | 3 |

TABLE 2

Evaluation of Comparative Examples

| Comp. Examples | (1) Productivity | (2) Number of voids (average) | (2) Retention ratio of strength (%) | (3) Surface condition | (4) Pressure rise (kg/cm²) | (5) Number of coarse particles | (6) Coloring intensity (%) | (6) Lightness (ΔL) | (7) Spinnability | (8) Retention of mechanical properties | (9) Unevenness of color |
|---|---|---|---|---|---|---|---|---|---|---|---|
| 1 | 3 | 13.2 | 91 | 3 | 68 | 3 | 82 | | 2 | 2 | 3 |
| 2 | 3 | 14.2 | 91 | 2 | 71 | 3 | 82 | | 2 | 2 | 3 |
| 3 | 3 | 28.4 | 82 | 1 | 250 | 1 | 80 | | 1 | 2 | 1 |
| 4 | 3 | 11.2 | 90 | 3 | 32 | 4 | 87 | | 3 | 3 | 3 |
| 5 | 2 | 8.6 | 94 | 3 | 33 | 4 | 87 | | 2 | 3 | 3 |
| 6 | 2 | 9.8 | 93 | 3 | 41 | 4 | 86 | | 2 | 3 | 3 |
| 7 | 3 | 17.6 | 88 | 1 | 105 | 2 | | −2.1 | 1 | 2 | 1 |
| 8 | 3 | 14.8 | 90 | 1 | 216 | 1 | | +4.4 | 1 | 2 | 1 |
| 9 | 3 | 13.4 | 92 | 1 | 98 | 2 | 80 | | 1 | 2 | 2 |
| 10 | 3 | 14.6 | 90 | 2 | 85 | 2 | 81 | | 1 | 2 | 3 |
| 11 | 3 | 14.0 | 91 | 1 | 259 | 1 | 75 | | 1 | 1 | 2 |
| 12 | 3 | 13.8 | 89 | 3 | 34 | 4 | 85 | | 2 | 3 | 3 |
| 13 | 3 | 19.2 | 85 | 1 | 284 | 1 | 70 | | 1 | 1 | 1 |
| 14 | 3 | 14.6 | 90 | 2 | 88 | 3 | 83 | | 1 | 3 | 3 |
| 15 | 3 | 12.2 | 91 | 2 | 79 | 3 | 84 | | 1 | 3 | 3 |
| 16 | 3 | 13.4 | 90 | 1 | 149 | 2 | 82 | | 1 | 2 | 2 |
| 17 | 1 | No evaluation | No evaluation | — | — | — | — | | — | — | — |

TABLE 2-continued

Evaluation of Comparative Examples

| Comp. Examples | (1) Productivity | (2) Number of voids (average) | (2) Retention ratio of strength (%) | (3) Surface condition | (4) Pressure rise (kg/cm²) | (5) Number of coarse particles | (6) Coloring intensity (%) | (6) Lightness (ΔL) | (7) Spinnability | (8) Retention of mechanical properties | (9) Unevenness of color |
|---|---|---|---|---|---|---|---|---|---|---|---|
| 18 | 1 | No evaluation | No evaluation | — | — | — | — | | — | — | — |
| 19 | 3 | 19.8 | 94 | 1 | 102 | 2 | 85 | | 2 | 2 | 3 |
| 20 | 2 | 14.6 | 92 | 1 | 80 | 2 | 82 | | 1 | 2 | 2 |
| 21 | 2 | 17.6 | 93 | 1 | 91 | 2 | 81 | | 1 | 2 | 2 |

The above results show that the coloring resin compositions of the examples had excellent pigment dispersibility, and were preferably obtained without the foaming of strands and pulsating flow. Molded articles (films, plates and fibers) having excellent surface conditions and mechanical strength were also provided from the compositions, in preferable coloring conditions with no unevenness of color or the like. On the contrary, the coloring resin compositions of the comparative examples had inferior productivity, pigment dispersibility, coloring strength, spinnability and so forth. The molded articles obtained therefrom showed insufficient surface conditions and mechanical strength.

The present disclosure relates to subject matter contained in Japanese Patent Application No. 2000-186413, filed on Jun. 21, 2000, the disclosure of which is expressly incorporated herein by reference in its entirety.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A coloring resin composition comprising a dispersing agent, a pigment and a thermoplastic resin; wherein the dispersing agent is expressed by the following Formula 1 and has a melting point of 60° C. to 120° C. and the thermoplastic resin is metallocene polyolefin having a melting point of 40° C. to 120° C.:

$$C_nH_{2n+1}(OCH_2CH_2)_mOH \quad \text{Formula 1}$$

wherein n is an integer of 26 to 50, and m is an integer of 4 to 100.

2. The coloring resin composition according to claim 1, wherein the metallocene polyolefin is metallocene polyethylene.

3. The coloring resin composition according to claim 1, wherein the metallocene polyolefin has a density of 0.87 to 0.91 g/cm³.

4. A colored resin molded article, comprising the coloring resin composition according to claim 1.

5. A coloring resin composition, wherein the composition is provided by removing water from a mixture comprising a dispersing agent expressed by the following Formula 1 and having a melting point of 60° C. to 120° C., a pigment, water and a metallocene polyolefin having a melting point of 40° C. to 120° C.:

$$C_nH_{2n+1}(OCH_2CH_2)_mOH \quad \text{Formula 1}$$

wherein n is an integer of 26 to 50, and m is an integer of 4 to 100.

6. The coloring resin composition according to claim 5, wherein the metallocene polyolefin is metallocene polyethylene.

7. The coloring resin composition according to claim 5, wherein the metallocene polyolefin has a density of 0.87 to 0.91 g/cm³.

8. The coloring resin composition according to claim 5, wherein the mixture is provided by adding the pigment and the metallocene polyolefin to an aqueous solution of the dispersing agent or an aqueous dispersion of the dispersing agent.

9. The coloring resin composition according to claim 5, wherein concentration of the dispersing agent relative to the water is 1 to 80 wt. % in the mixture.

10. A colored resin molded article, comprising the coloring resin composition according to claim 5.

* * * * *